US008869588B2

(12) United States Patent
Calvarese

(10) Patent No.: US 8,869,588 B2
(45) Date of Patent: Oct. 28, 2014

(54) ULTRASONIC POSITIONING SYSTEM WITH REVERBERATION AND FLIGHT TIME COMPENSATION

(75) Inventor: Russell E. Calvarese, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 453 days.

(21) Appl. No.: 13/400,693

(22) Filed: Feb. 21, 2012

(65) Prior Publication Data

US 2013/0213112 A1 Aug. 22, 2013

(51) Int. Cl.
*G01B 21/16* (2006.01)

(52) U.S. Cl.
USPC .......................................................... 73/1.79

(58) Field of Classification Search
None
See application file for complete search history.

(56) References Cited

U.S. PATENT DOCUMENTS

| 6,295,312 | B1 | 9/2001 | Jarvis | |
|---|---|---|---|---|
| 8,416,071 | B2 * | 4/2013 | Adcook et al. | 340/539.13 |
| 2010/0271263 | A1 * | 10/2010 | Moshfeghi | 342/378 |

FOREIGN PATENT DOCUMENTS

| EP | 19950931652 A | 3/2003 |
|---|---|---|
| WO | 2005111653 B2 | 11/2005 |

OTHER PUBLICATIONS

Wei Liang and Pei-Wen Que "Maximum non-Gaussianity Parameters Estimation of Ultrasonic Echoes and its Application in Ultrasonic non-destructive Evaluation" Meas. Sci. Technol. 18/3743 dated Oct. 19, 2007.

* cited by examiner

*Primary Examiner* — Robert R Raevis
(74) *Attorney, Agent, or Firm* — Brian M. Mancini

(57) ABSTRACT

Compensating reverberation and flight times in an ultrasonic positioning system includes establishing maximum flight and reverberation times for ultrasonic signals within an environment. These maximum times are added to define a maximum buffer time period. Ultrasonic signals are emitted sequentially from each of a plurality of emitters, where the ultrasonic signal from each emitter is separated in time by at least one maximum buffer time period. Afterwards, a reverberation and flight time for each ultrasonic signal is determined and then the flight time of the next subsequent emitter is subtracted to define an adjusted emit time for the emitter that emitted that ultrasonic signal. An emitting time for a next subsequent emitter as adjusted to maximize the refresh rate. Emitters are scheduled to emit such that the receiver is always receiving a signal or waiting for actual reverberation.

14 Claims, 3 Drawing Sheets

ULTRASONIC POSITIONING SYSTEM WITH REVERBERATION AND FLIGHT TIME COMPENSATION

FIELD OF THE DISCLOSURE

The present disclosure relates generally to an ultrasonic positioning system, and more particularly to the compensation of reverberation time and flight time in an ultrasonic positioning system.

BACKGROUND

An ultrasonic receiver can be used to determine the location of items that contain ultrasonic emitters, such as a mobile device present within a retail, factory, or warehouse environment, for example. The ultrasonic emitter can transmit ultrasonic energy in a short burst which can be received by an ultrasonic transducer (microphone) in the ultrasonic receiver, thereby establishing the presence of the device within the environment.

Further, the use of several ultrasonic receivers distributed within the environment can also be used to provide a specific location of a particular device using techniques known in the art such as triangulation, trilateration, and the like. However, unlike radio frequency locationing systems, ultrasonic locationing systems suffer from particular problems related to the character of ultrasonic sound waves and their environment of use. Firstly, ultrasonic waves are typically subject to acoustic reverberation. Therefore, a first signal sent by a first emitter directly followed by a second signal sent by a second emitter may cause the second signal to be missed by the receiver, due to the second signal arriving at the receiver during the reverberation of the first signal. Secondly, ultrasonic signals are vastly slower than radio frequency signals. Therefore, a first signal sent by a first emitter followed by a second signal sent by a second emitter could arrive at the receiver simultaneously preventing reception by the receiver, due to the second emitter being closer to the receiver.

The obvious solution to this problem is to provide a time buffer in the system such that a signal sent by any emitter in the system will be properly received by the receiver before any other emitter in the system can send a signal to the receiver. This solution entails determining a maximum flight time for a signal from any emitter within the reading environment, and also determining a time for reverberations to die down before any other signal can be received. These two times are added to provide a buffer time period. The system then guarantees that any emitter can only emit an ultrasonic signal at least one buffer time period after any another other emitter can send an ultrasonic signal to the receiver.

However, due to the relatively long reverberation and flight times of ultrasonic sound waves, the use of a buffer time period will not produce signal repetitions to refresh a device position at a high enough rate when there are many emitters in the system.

Accordingly, there is a need for an improved technique to resolve the above issues with an ultrasonic positioning system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
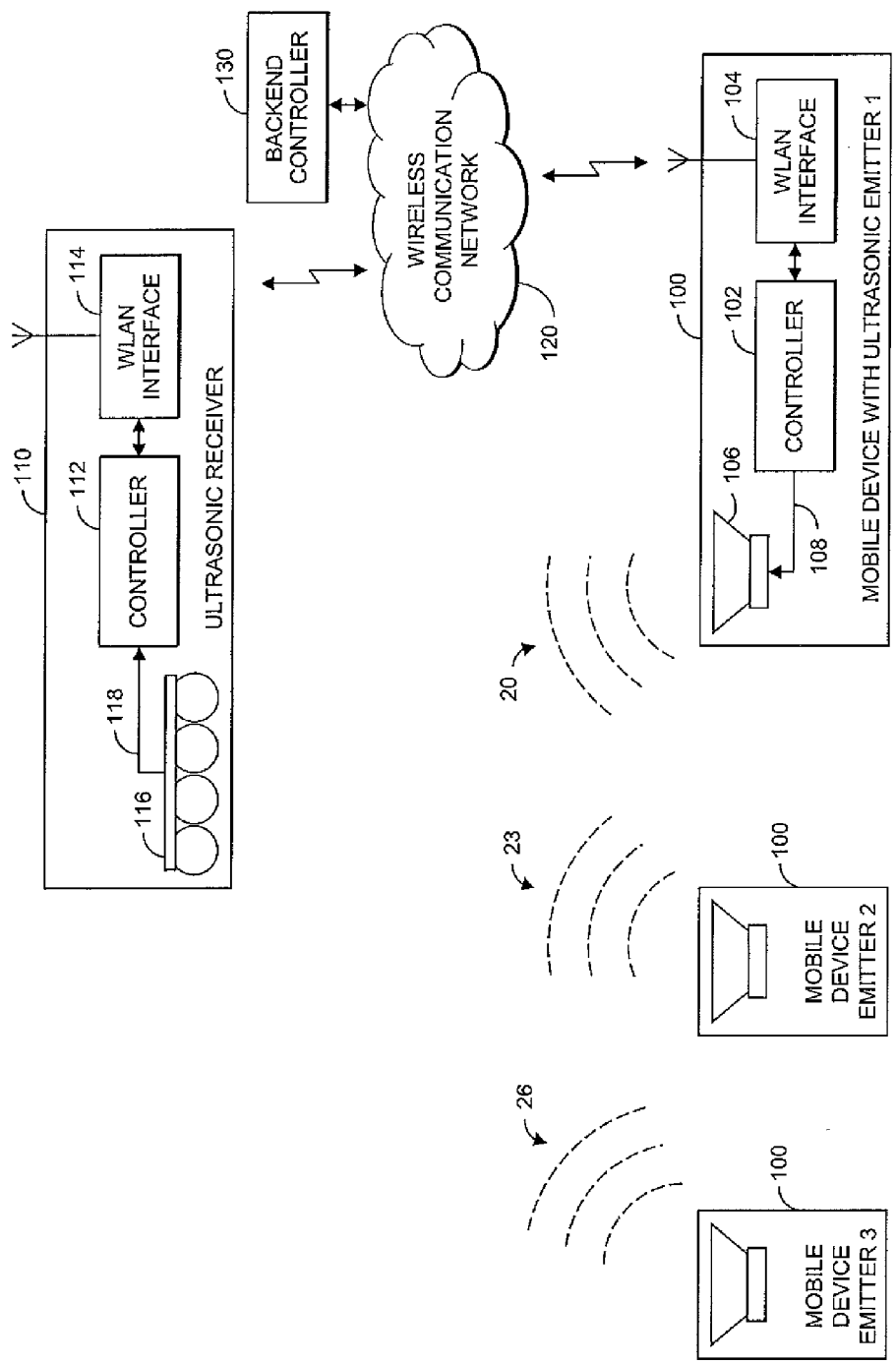
FIG. 1 is a block diagram of an ultrasonic positioning system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to resolve the issues with ultrasonic positioning of a device with an ultrasonic emitter within an environment. In particular, the present invention compensates for flight time and reverberation time in order to shorten the timing of, and increase the number of, emitter signals that can be used for more accurate positioning for more emitters, as will be described below.

An ultrasonic positioning system should have as high of a sample rate as possible such that many emitters can be located with high position refresh with improved accuracy. It is desirable to have frequent samples to allow averaging to increase positioning accuracy and help when the ultrasonic environment gets noisy, which can cause emitter signals to be missed. Also, there may be occurrences in the ultrasonic locationing system that result in a missed sample due to the collision of signals at the receiver. Therefore, the present invention controls emitters that are in cooperation to avoid collisions and to give ample time for the reverberation to cease before subsequent emissions. The present invention also controls emitters to give ample time to account for ultrasonic flight times.

The device to be positioned and incorporating the emitter can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, personal computers, and personal digital assistants, and the like, all referred to herein as a device. Each device comprises a processor that can be further coupled to a keypad, a speaker, a microphone, a display, signal processors, and other features, as are known in the art and therefore not shown.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, access points/ ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of an ultrasonic positioning system, in accordance with the present invention. An ultrasonic transponder such as a piezoelectric speaker or emitter 106 can be implemented within a mobile device 100. The emitter can send a short burst of ultrasonic sound (e.g. 20) to indicate the presence of the mobile device 100 within the environment. The mobile device can include a controller 102 to provide a specific signal 108 to be transmitted by the emitter 106. The controller 102 can also be coupled to a wireless local area network interface 104 for wireless communication with other devices in the communication network 120.

The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

An ultrasonic receiver 110 includes a transducer such as an ultrasonic microphone 116 that can respond to an ultrasonic sound pressure wave (e.g. 20) transmitted from an ultrasonic emitter 106 of a mobile device. The microphone 116 provides electrical signals 118 to a receiver controller 112, such that the receiver controller will be aware of the presence of a device incorporating that ultrasonic emitter within the environment. The receiver controller 112 can also be coupled to a wireless local area network interface 114 for wireless communication with other devices in the communication network 120. Alternatively, the controller 112 could be connected to the communication network 120 through a wired interface connection (not shown), such as an Ethernet interface connection.

In order to provide positioning ability, using a multilateration technique for example, the transducer of the present invention includes a plurality of microphones 116 able to discriminate between different arrival times of a particular ultrasonic signal. In one embodiment, there are four microphones 116 integrated within a single receiver 110 housing. In this embodiment, three of the microphones can be disposed at each apex of a substantially triangular configuration, such as in a substantially flat triangular housing having dimensions of approximately twelve inches per side, and where the fourth microphone is disposed in the middle of the triangular configuration, substantially coplanar with the other microphones. For unobtrusiveness and clear signaling, the housing can be affixed to a ceiling of the environment, where the position of each microphone is known and fixed. Of course, it should be recognized than many different housing and microphone configurations could be utilized with any number of microphones. However, the embodiment described herein utilizes relatively closely-spaced microphones within a singular housing, where the closeness of the microphones is accommodated by the present invention as described below.

As the location and position of these microphones 116 is known and fixed, a signal received by these microphones can used to locate and track the position of an emitter (and the device/user carrying the emitter) using time delay of arrival (TDOA) at each microphone multilateration, or other suitable locationing technique.

In practice, there may be more than one mobile device within the environment carrying an emitter. In this case, the receiver will not know which particular device is the one emitting the ultrasonic signal. Therefore, some control over each emitter must be exercised in order to know which emitter is transmitting, and which emitter is located at which position. In one embodiment, a backend controller 130 of the positioning system can communicate over the communication network 120 in order to direct different mobile devices 100 to emit an ultrasonic signal burst at different times. This can be accomplished using IEEE 802.11 polling to initiate the ultrasonic burst. For example, the backend controller can communicate with the mobile device of emitter 1 to cause it to transmit an ultrasonic burst. Upon receiving the burst, the receiver 110 can communicate with the backend controller over the communication network that it has received the burst, and the backend controller will then know that the burst came from emitter 1. The backend controller also knows when the burst was sent, and can then determine the flight time of the burst by subtracting the emitting time from the acknowledgment of the reception time from the receiver.

The backend controller could also radio the time of the originating burst to the receiver which would allow the receiver to convert TDOA values into flight times allowing trilateration which has accuracy advantages over multilateration is some cases. Flight time can also be calculated once the position is determined by multilateration by simply taking the square root of the sum of the squares of the emitter's relative position in three dimensional space then dividing by the speed of sound. It should be noted that the radio frequency communications are relatively instantaneous next to the flight time of the ultrasonic signal and could be ignored. Using a locationing technique such as multilateration, along with the flight time, the receiver 110 could inform the backend controller of the position of emitter 1, which the backend controller can use to track its position during subsequent bursts ordered from emitter 1.

In the above scenario, the receiver is subject to reverberations of the ultrasonic signal. Therefore, the backend controller must wait for the flight time and the reverberation time to die down from emitter 1 before triggering other emitters (e.g. 2 and 3). If not, ultrasonic signal collisions could occur, and emitter signals would not be received properly, i.e. they would be missed. One solution to ensure that ultrasonic signals are not missed is to add a worst case flight time to a worst case reverberation time, to define a maximum buffer time period, and to subsequently delay any emitter from emitting by at least this maximum buffer time period. This solution is shown in FIG. 2 and can be initiated when signal flight times and reverberations times are not yet known within the environment.

Figure 2:
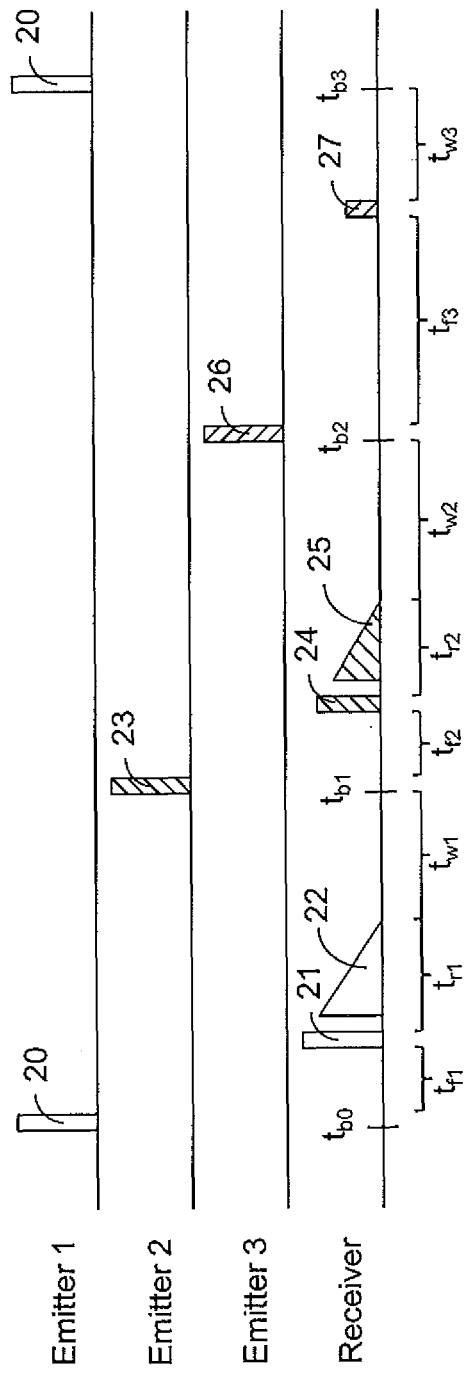
FIG. 2 is a graphical representation of a timing diagram of an ultrasonic positioning system using buffer time periods, in accordance with one embodiment of the present invention.

Referring to FIG. 2, a receiver (such as receiver 110 of FIG. 1) is located within an environment. The receiver is operable to receive ultrasonic burst signals from a plurality of emitters (such as emitters 100 of FIG. 1) at different times. Although only three emitters are represented, it should be realized that many more emitters could be deployed within the environment. It is envisioned that up to ten emitters can be used in a typical retail environment, for example. At first, the system implements the maximum buffer time $t_b$ between each emitter burst, which is the maximum reverberation time and flight time for any emitter within the environment. For example, at the beginning of each buffer time (i.e. $t_{b0}, t_{b1}, t_{b2}$) each emitter is allowed to transmit its respective ultrasonic signal (i.e. 20, 23, 26). The time until the reception of each signal (i.e. 21, 24, 27) defines a flight time of each signal (i.e. $t_{f1}, t_{f2}, t_{f3}$).

In the example shown, the flight times $t_{f1}$ and $t_{f2}$ are about the same. Therefore, it is known that the emitters 1 and 2 are about equidistant from the receiver. The flight time $t_{f3}$ is much longer than the flight times $t_{f1}$ and $t_{f2}$, and therefore the receiver is much farther away from the receiver. The flight times can be used to estimate the actual distance from the receiver given the known (measured) speed of ultrasonic sound within the environment. For example, the backend controller can radio the receiver with the time when the emitter transmits the ultrasonic burst (i.e. RF synchronization), and then the receiver can measure the actual amount of time it takes to receive the burst to determine the flight time, and subsequently the flight distance. Using the microphone array and time delay of arrivals of the ultrasonic signal, a directional angle to the emitter can be determined. This angle and distance are then used to determine the position of the emitter, which can be tracked by the backend controller during subsequent measurements.

Depending on the configuration of the environment and boundary conditions therein, the signals received by the receiver may be subject to different amounts of reverberation. As used herein, reverberation time is the amount of time it takes for the reverberation of a signal to fall to below an average noise floor in the environment, (i.e. a defined noise threshold). In the example shown, the signal 21 from the first emitter is accompanied by a large amplitude of reverberation 22 that lasts a relatively long time, $t_{r1}$. The signal 24 from the second emitter results in a somewhat lesser amplitude of reverberation 25 that lasts a shorter time, $t_{r2}$. The signal 27 from the third emitter is received cleanly and does not exhibit much reverberation at all, i.e. any reverberation is already below the noise floor.

Effective reverberation times can vary from 0 ms to 200 ms (milliseconds) in a typical environment. Large halls can have reverberation times measured in the seconds. However, it is unlikely that reflected ultrasonic signals could be detected by a receiver at the long distances of a large hall. Moreover, waiting for the worst case reverberation time between subsequent emissions would preclude a reasonable sample rate for systems with more than a few emitters. Therefore, a reasonable estimate for a maximum reverberation time is used in the present invention, given a typical use environment. Alternatively, for a given environment, a maximum reverberation time can be empirically determined.

Also, it is preferred to establish a maximum flight time for an environment, i.e. at a farthest distance apart for the receiver and an emitter where the receiver is still able to hear the emitter reliably. In other words, it is unlikely that ultrasonic signals could be detected at long distances, such as those of a large hall. Therefore, a reasonable maximum flight time can be established, such as 200 ms, which is approximately 200 feet for ultrasonic signals. This maximum flight time can be estimated or empirically determined in the actual environment.

Referring back to FIG. 2, it can be seen that in the worst case scenario, there is extra time between burst cycles, $t_{w1}, t_{w2}, t_{w3}$, that is wasted, and which the present invention serves to recover, as will be detailed below. In this example, it is assumed that ultrasonic signal that is emitted by each emitter is a 300 μS emitter pulse train burst. At 40 kHz, this is about twelve cycles. A 200 mS worst case reverberation time and 200 mS worst case flight time are assumed, i.e. a 400 mS maximum time buffer period. It is also assumed that 50% of emissions are missed due to issues with the environment including acoustics, RF availability, and ultrasonic collisions and noise. For ten emitters in range of the receiver, the worst case refresh rate for each emitter would be:

$$0.5/(10*(300 \ \mu S+200 \ mS+200 \ mS))=0.125 \ Hz \ or \ every \ 8 \ seconds$$

The present invention eliminates the wasted time $t_{w1}, t_{w2}, t_{w3}$ by addressing both the reverberation issue and the flight time issue. In particular, the present invention has the receiver measure the time that the reverberation of each emission reduces into the noise. This measured reverberation time for each emitter is then stored in the receiver or sent with the location information to the backend controller. The system also determines and stores the flight time, either measured for the multilateration case or calculated for the TDOA case. These measured reverberation times and flight times are stored and updated for each emitter at each signal reception. Then receiver or the backend controller commands each emitter to emit with proper timing such that the receiver is always either receiving or waiting for actual reverberation times. In particular, the present invention not only eliminates the wasted time $t_{w1}, t_{w2}, t_{w3}$ it also accommodates the flight time of the next signals, $t_{f2}, t_{f3}, t_{f1}$. For the example given above, if the average measured reverberation time was 25 mS (down from the 200 mS needed worst case design point) then the refresh rate would be:

$$0.5/(10*(300 \ \mu S+25 \ mS))=2 \ Hz \ or \ every \ half \ second$$

which is a sixteen times improvement over the worst case scenario.

Figure 3:
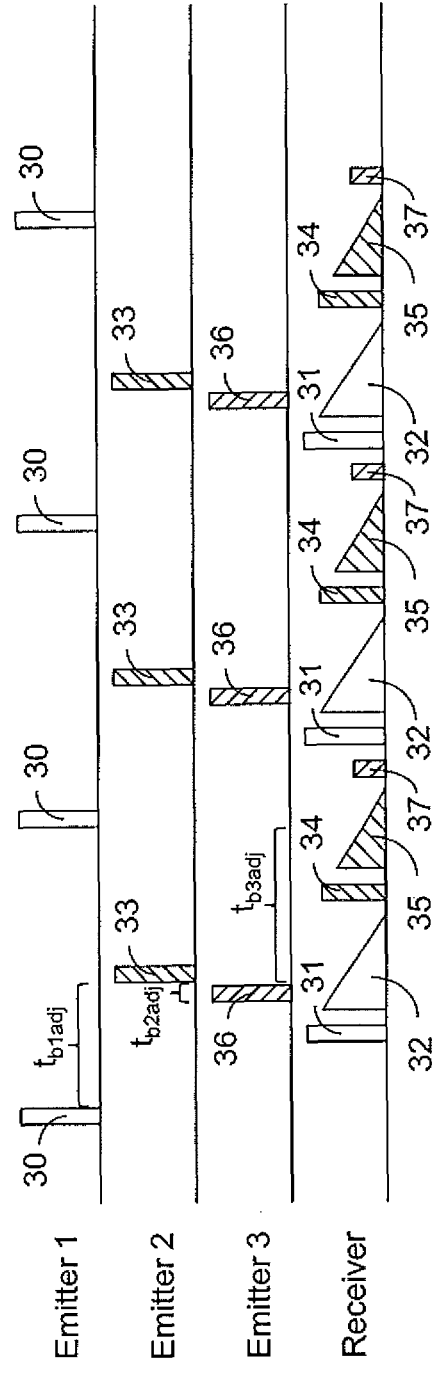
FIG. 3 is a graphical representation of a timing diagram of an ultrasonic positioning system, in accordance with some embodiments of the present invention.

Referring to FIG. 3, the present invention defines an adjusted buffer time period, which is the measured reverberation time of each signal, added with the measured flight time for that signal, subtracted by the flight time of the next subsequent signal to be emitted in the repeated sequence. For example, the adjusted buffer time period of emitter 1, $t_{b1adj}=t_{f1}+t_{r1}-t_{f2}$, where ultrasonic burst 33 from emitter 2 is transmitted $t_{b1adj}$ after the ultrasonic burst 30 from emitter 1. Similarly, the adjusted buffer time period of emitter 2, $t_{b2adj}=t_{f2}+t_{r2}-t_{f3}$, where ultrasonic burst 36 from emitter 3 is transmitted $t_{b2adj}$ after the ultrasonic burst 33 from emitter 2.

It should be noted that the adjusted buffer time period can be a negative value, as shown for emitter 2. Inasmuch as the emitters are incorporated into mobile devices, the times between emitter transmissions can include a guard band to accommodate the movement of the devices. In particular, the times between emissions should not be exactly the adjusted buffer time period, but should be increased a little more than the adjusted buffer time period, in order to accommodate this guard band due to emitter movement within the environment.

In this way, the present invention receives subsequent emitted signals at only the reverberation time after the previous signal, thereby maximizing efficiency. It should also be recognized that reverberation times of far emitters will be less than close emitters because the initial amplitude is less for far emitters than close emitters and reflections are nearly always reduced in amplitude due to increased travel distance and imperfect reflections. Far emitters may not even have a detectible reflection. However, it should also be recognized that reverberation time for any signal can be further reduced. For example, the present invention also has the option to reduce emitter amplitude of strong receivers to minimize actual reverberation time.

The 300 µS ultrasonic burst used in the example herein comprises twelve cycles for a 40 kHz ultrasonic signal. As each microphone receives an ultrasonic signal the receiver can used cross-correlation of the sine waves of the twelve cycles to determine a direction of an emitter along with distances between microphones to determine flight time distance. Since the microphones of the present invention are closely spaced, the accuracy of this distance decreases for further-away emitters. In other words, the sine waves could shift an entire wavelength at ultrasonic frequencies, thereby confusing the distance. Therefore, the present invention can introduce RF synchronization to tell the receiver exactly when a signal was emitted. As described above, since the microphones are closely spaced, the present invention sends these RF synchronization signals to the receiver to tell when a burst was emitted. As a result, RF synchronization can be used to provide more accurate flight times for farther emitters.

The present invention also accounts for the age of the stored adjusted buffer time period. For example, if the receiver has not heard a particular emitter for a predetermined time period, then the adjusted buffer time period is returned to the maximum buffer time period. This will take account of an emitter that may have moved too much within the environment, and now has an undetermined reverberation time and flight time.

Figure 4:
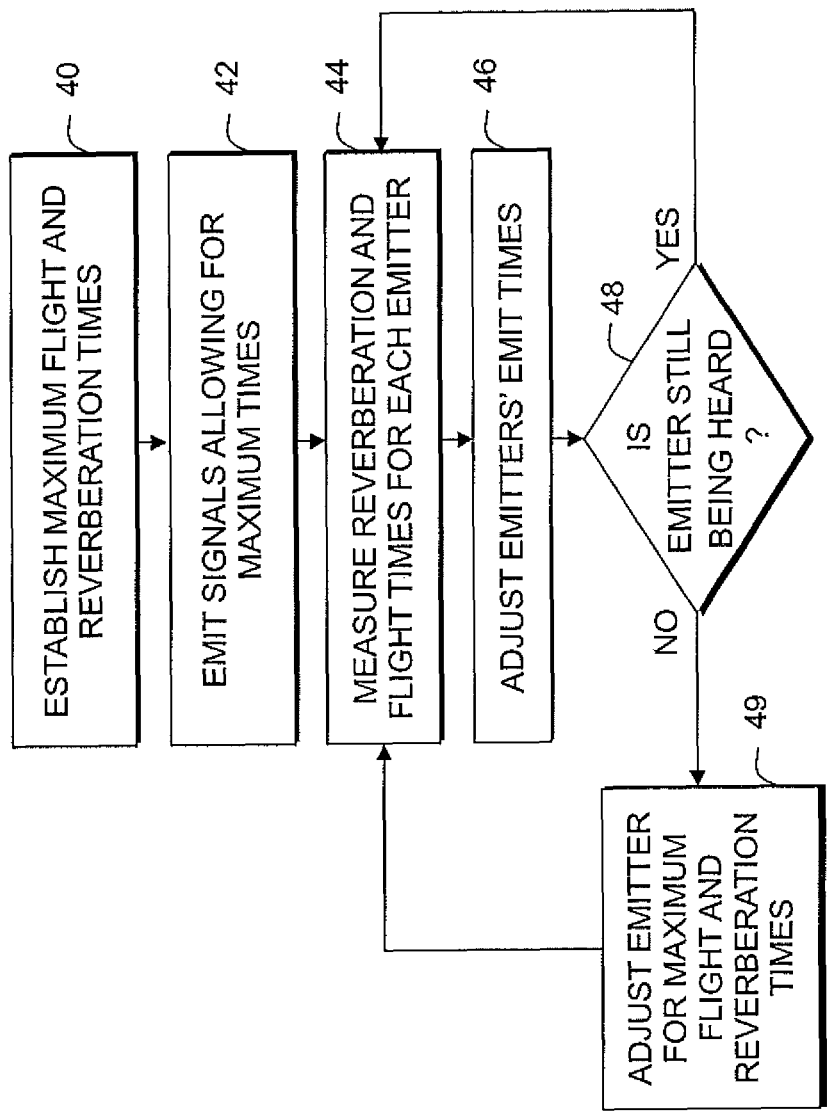
FIG. 4 is a diagram illustrating a method for ultrasonic positioning, in accordance with some embodiments of the present invention.

FIG. 4 is a diagram illustrating a method of compensating for reverberation time and flight time in an ultrasonic positioning system, according to some embodiments of the present invention.

A first step 40 includes establishing a maximum flight time and a maximum reverberation time for ultrasonic signals within an environment, wherein the maximum flight time and the maximum reverberation time are added to define a maximum buffer time period.

A next step 42 includes emitting ultrasonic signals sequentially from each of a plurality of emitters within the environment, the ultrasonic signal from each emitter separated in time by at least one maximum buffer time period.

A next step 44 includes measuring a reverberation time and a flight time for each ultrasonic signal, the measured flight time and the measured reverberation time are added together and then the flight time of the next subsequent emitter signal is subtracted to define an adjusted buffer time period for the emitter that emitted that ultrasonic signal. This adjusted buffer time period is stored for each emitter for each measurement.

A next step 46 includes adjusting the emitting time for a next subsequent emitter to be at least the adjusted buffer time period of the previous emitter. The determining 44 and adjusting 46 steps are repeated for each emitted ultrasonic signal to correct the adjusted buffer time period for each emitter. Additionally, an amplitude of the ultrasonic signal can be reduced to reduce reverberation time. Also, the adjusted buffer time can be increased to account for movement of the emitters within the environment.

The method includes a further step 49 of returning the adjusted buffer time period of an emitter to a maximum buffer time period if the emitter does not emit a detectable ultrasonic signal for a predetermined period of time. i.e. the emitter is no longer being heard by the receiver.

Advantageously, the present invention provides ultrasonic positioning system where the position of an item can be improved up to sixteen times over the prior art. The present invention allows for the addition of more emitters to improve positioning, and allows for real-time tracking of an item. Further, the present invention provides the ability track more items than can be done in the prior art. The present invention is applicable to long range and tight microphone spacing in an ultrasonic reader.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for compensating for reverberation time and flight time in an ultrasonic positioning system, the system comprising:
    a plurality of emitters each operable to emit an ultrasonic signal;
    a receiver operable to receive ultrasonic signals; and
    a backend controller communicatively coupled to the emitters and the receiver, wherein the system is operable to establish a maximum flight time and a maximum reverberation time for ultrasonic signals within an environment, wherein the maximum flight time and the maximum reverberation time are added to define a maximum buffer time period,
    wherein the backend controller is operable to direct each emitter to sequentially emit a respective ultrasonic signal within the environment such that the ultrasonic signal from each emitter is separated in time by at least one maximum buffer time period, and
    wherein the system is operable to measure a reverberation time and a flight time for each ultrasonic signal, which are added together and then the flight time of the of the next subsequent emitter is subtracted to define an adjusted buffer time period for the emitter that emitted that ultrasonic signal, and
    wherein the backend controller is operable to adjust the emitting time for a next subsequent emitter to be at least the adjusted buffer time period of the previous emitter, which is repeated for each emitted ultrasonic signal to correct the adjusted buffer time period for each emitter.

2. The system of claim 1, wherein the adjusted buffer time period can have a negative value.

3. The system of claim 1, wherein if an emitter does not emit a receiver detectable ultrasonic signal for a predetermined period of time, the adjusted buffer time period for that emitter is returned to the maximum buffer time period.

4. The system of claim 1, wherein the determination of flight time is determined using the time when an ultrasonic signal is received and subtracting a received radio frequency signal from the backend controller indicating the time when an emitter transmitted the ultrasonic signal.

5. The system of claim 1, wherein a direction to the emitter can be determined using a time delay of arrival of the ultrasonic signal from that emitter impinging on each microphone of an array, and a position of the emitter can be determined using the direction and the flight time.

6. The system of claim 5, wherein the microphones are incorporated in a singular housing and are configured in an array having a maximum dimension of not more than twelve inches.

7. The system of claim 5, wherein the system uses a multilateration locationing technique to determine and track a position of each emitter.

8. The system of claim 1, wherein the reverberation time is defined as the amount of time for signal reverberations to die down to below a defined noise threshold.

9. The system of claim 1, wherein an amplitude of the ultrasonic signal can be reduced to reduce reverberation time.

10. The system of claim 1, wherein the adjusted buffer time can be increased to account for movement of the emitters within the environment.

11. A method of compensating for reverberation time and flight time in an ultrasonic positioning system, the method comprising the steps of:
    establishing a maximum flight time and a maximum reverberation time for ultrasonic signals within an environment, wherein the maximum flight time and the maximum reverberation time are added to define a maximum buffer time period;
    emitting ultrasonic signals sequentially from each of a plurality of emitters within the environment, the ultrasonic signal from each emitter separated in time by at least one maximum buffer time period;
    measuring a reverberation time and a flight time for each ultrasonic signal, the measured flight time and the measured reverberation time are added together and then the flight time of the next subsequent emitter is subtracted to define an adjusted buffer time period that is stored for the emitter that emitted that ultrasonic signal;

adjusting the emitting time for a next subsequent emitter to be at least the adjusted buffer time period of the previous emitter; and repeating the determining and adjusting steps for each emitted ultrasonic signal to correct the adjusted buffer time period for each emitter.

12. The method of claim 11, further comprising the step of returning the adjusted buffer time period of an emitter to a maximum buffer time period if the emitter does not emit a detectable ultrasonic signal for a predetermined period of time.

13. The method of claim 11, wherein the adjusting step includes reducing an amplitude of the ultrasonic signal to reduce reverberation time.

14. The method of claim 11, wherein the adjusting step includes increasing the adjusted buffer time to account for movement of the emitters within the environment.

* * * * *